(12) United States Patent
Lebron et al.

(10) Patent No.: US 10,823,460 B2
(45) Date of Patent: Nov. 3, 2020

(54) INTEGRAL COLLECTOR STORAGE SOLAR WATER HEATER

(71) Applicants: Jose Lebron, Mayagüez, PR (US); Sheilla Torres-Nieves, Mayagüez, PR (US)

(72) Inventors: Jose Lebron, Mayagüez, PR (US); Sheilla Torres-Nieves, Mayagüez, PR (US)

( * ) Notice: Subject to any disclaimer, the term of this patent is extended or adjusted under 35 U.S.C. 154(b) by 359 days.

(21) Appl. No.: 15/367,346

(22) Filed: Dec. 2, 2016

(65) Prior Publication Data

US 2017/0159973 A1   Jun. 8, 2017

Related U.S. Application Data

(60) Provisional application No. 62/262,406, filed on Dec. 3, 2015.

(51) Int. Cl.
*F24S 10/70* (2018.01)
*F24S 60/30* (2018.01)
*F24S 60/00* (2018.01)
*F24S 20/00* (2018.01)

(52) U.S. Cl.
CPC ............ *F24S 10/746* (2018.05); *F24S 60/00* (2018.05); *F24S 60/30* (2018.05); *F24S 2020/18* (2018.05); *Y02E 10/44* (2013.01)

(58) Field of Classification Search
CPC .................. F24S 60/00; F24S 60/30
See application file for complete search history.

(56) References Cited

U.S. PATENT DOCUMENTS

| | | | | |
|---|---|---|---|---|
| 4,116,223 A | * | 9/1978 | Vasilantone | F24S 23/31 126/643 |
| 4,172,441 A | * | 10/1979 | Newton | F24S 10/73 126/624 |
| 4,232,656 A | * | 11/1980 | Teagan | F24S 40/58 126/588 |
| 4,276,122 A | | 6/1981 | Snyder | |
| 4,280,480 A | | 7/1981 | Raposo | |
| 4,300,537 A | * | 11/1981 | Davis | F24S 60/30 126/600 |
| 4,479,487 A | * | 10/1984 | Migdal | F24D 11/003 126/588 |
| 4,513,731 A | | 4/1985 | Campbell | |
| 4,513,732 A | * | 4/1985 | Feldman, Jr. | F02G 1/0445 126/570 |
| 4,539,975 A | | 9/1985 | Teagan | |
| 4,979,494 A | | 12/1990 | Andersent et al. | |
| 5,462,047 A | | 10/1995 | Kleinwachter et al. | |
| 5,770,295 A | * | 6/1998 | Alderman | B32B 3/08 428/68 |
| 6,763,826 B1 | | 7/2004 | Gumm et al. | |

(Continued)

*Primary Examiner* — David J Laux
(74) *Attorney, Agent, or Firm* — Luis Figarella

(57) ABSTRACT

An integral collector storage solar water heat collecting apparatus comprises an integral solar heat collecting and storage apparatus having one or more solar ray and ambient temperature heat absorbing and storage material(s) which hold said energy within an enclosure, said enclosure having within it one or more heat exchange coils with pressurized water to be heated for the end-user or client from said heat storage. Said heat collector is combined with other system components to provide heated water to users.

21 Claims, 7 Drawing Sheets

(56) References Cited

U.S. PATENT DOCUMENTS

| | | |
|---|---|---|
| 7,398,779 B2 | 7/2008 | Bowen et al. |
| 8,047,200 B1 | 11/2011 | Flaherty |
| 9,033,254 B2 | 5/2015 | Wieland |
| 2015/0107581 A1* | 4/2015 | Lin .................. E04H 4/129 126/621 |

* cited by examiner

INTEGRAL COLLECTOR STORAGE SOLAR WATER HEATER

CROSS-REFERENCE TO RELATED APPLICATIONS

This application claims priority to U.S. Provisional patent application Ser. No. 62/262,406 titled "Spheroidal Integral Collector Storage Solar Water Heater", filed on Dec. 3, 2015 the disclosure of which is herein incorporated by reference in its entirety.

PATENTS CITED

The following documents and references are incorporated by reference in their entirety, Teagan (U.S. Pat. Nos. 4,232,656 and 4,539,975), Wieland (U.S. Pat. No. 9,033,254) and Raposo (U.S. Pat. No. 4,280,480).

FIELD OF THE INVENTION

The present invention relates to a solar heat collecting apparatus, and particularly, to a solar heat collecting apparatus in which a separate material is utilized to collect and hold the heat from the sun's rays and the ambient within an enclosure, said enclosure having within it a coil with pressurized water to be heated for the end-user or client.

DESCRIPTION OF THE RELATED ART

Solar heat collectors typically include some form of structure enclosing tubing in which the fluid to be heated circulates, usually having translucent walls, so that the tubes may absorb heat from direct sunlight as well as from any air held within the transparent walls. The prior art shows that most solar heat collectors typically include pipes holding pressurized water (to be used directly by the users in their showers, cleaning, etc.) with an additional storage tank (FIG. 1) meant to store already heated water. The water is typically warmed throughout the system via the thermal gradient of water, which produces a buoyancy-driven flow, although active re-flow of the water is possible.

The above arrangement has a number of disadvantages, many of which become evident as increased manufacturing, installation and operation costs, lost efficiencies, shortened lifespan, etc. One particular problem of said systems is that the installer may add collectors without adding storage. This can drastically increase the risk of overheating that can damage or decrease the life of the solar water heater. On the other hand, if not enough collectors are connected to the tank, risk of under heating are incurred. Another problem is encountered when sub-freezing conditions are present, for anti-freeze measures must be taken for both the collector and the storage fluid areas. What is needed is a system having increased reliability, better energy efficiency and reduced costs.

SUMMARY OF THE INVENTION

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

In one aspect, the invention is about a solar heating system for heating water comprising a heat collector enclosure having at least one broad spectrum quality opening designed to be translucent to solar radiation, heat storage components within said heat collector enclosure, said heat storage components comprised of one or more heat storage enclosures, each said heat storage enclosure having a sealed volume containing a thermal mass mix of materials and one or more lengths of tubing within said sealed volume and two or more sealed interface openings within each said heat collector and each said heat storage enclosures to allow for fluid contact between the lengths of tubing inside each said sealed heat storage enclosure inner volume and pipes external to said solar heating system.

In another aspect, each said length of tubing inside each said heat storage enclosure is comprised of one of more loops of tubing within each said heat storage enclosure. In yet another aspect, each said length of tubing is arranged as a coil having no turn at an angle sharper than 45 degrees. In another aspect, said heat collector, said broad spectrum quality opening and each said heat storage enclosure have rectangular shapes and said thermal mass mix of materials is comprised of a mixture of one or more of the following: water, salt, glycol, anti-freeze, gels, salt hydrates, paraffin, sand, petroleum based PCM, Bio-based PCMs and/or any other suitable thermal mass material which enhances heat retention. In yet another aspect, one or more portions of the tubing inside each said heat storage collector have fins or other tubing extrusions; and thermal insulation material is placed in the space between one or more of said heat storage sides and the respective side of the heat enclosure that contains said heat storage component. In another aspect, said heat collector has a stand to support said lower layer at an angle to the horizontal datum. In yet another aspect, said heat collector, said broad spectrum quality opening and said heat storage enclosure have spheroid shapes and said thermal mass mix of materials is comprised of a mixture of one or more of the following: water, salt, glycol, anti-freeze, gels, salt hydrates, paraffin, sand, petroleum based PCM, Bio-based PCMs and/or any other suitable thermal mass material which enhances heat retention.

In one aspect, the invention is about a solar heating system for heating water comprising a heat collector enclosure having at least one broad spectrum quality opening designed to be translucent to solar radiation, heat storage components within said heat collector enclosure, said heat storage components comprised of one or more heat storage enclosures, each said heat storage enclosure having a sealed volume containing a thermal mass mix of materials and one or more lengths of tubing within said sealed volume, two or more sealed interface openings within each said heat collector and each said heat storage enclosures to allow for fluid contact between the lengths of tubing inside each said sealed heat storage enclosure inner volume and pipes external to said solar heating system, a mixing valve that mixes water from a water supply system with that exiting said coil tubing, said mixture ratio being such that the water does not exceed a specified maximum temperature and one or more supplemental heaters that take the mixing valve output fluid and if necessary apply supplemental heat to bring it to a programmed temperature. In another aspect, each said length of tubing inside each said heat storage enclosure is comprised of one of more loops of tubing within each said heat storage enclosure. In yet another aspect, each said length of tubing is arranged as a coil having no turn at an angle sharper than 45 degrees.

In another aspect, said heat collector, said broad spectrum quality opening and each said heat storage enclosure have rectangular shapes and said thermal mass mix of materials is comprised of a mixture of one or more of the following: water, salt, glycol, anti-freeze, gels, salt hydrates, paraffin, sand, petroleum based PCM, Bio-based PCMs and/or any other suitable thermal mass material which enhances heat retention.

Other features and advantages of the present invention will become apparent upon examining the following detailed description of an embodiment thereof, taken in conjunction with the attached drawings.

Figure 1:
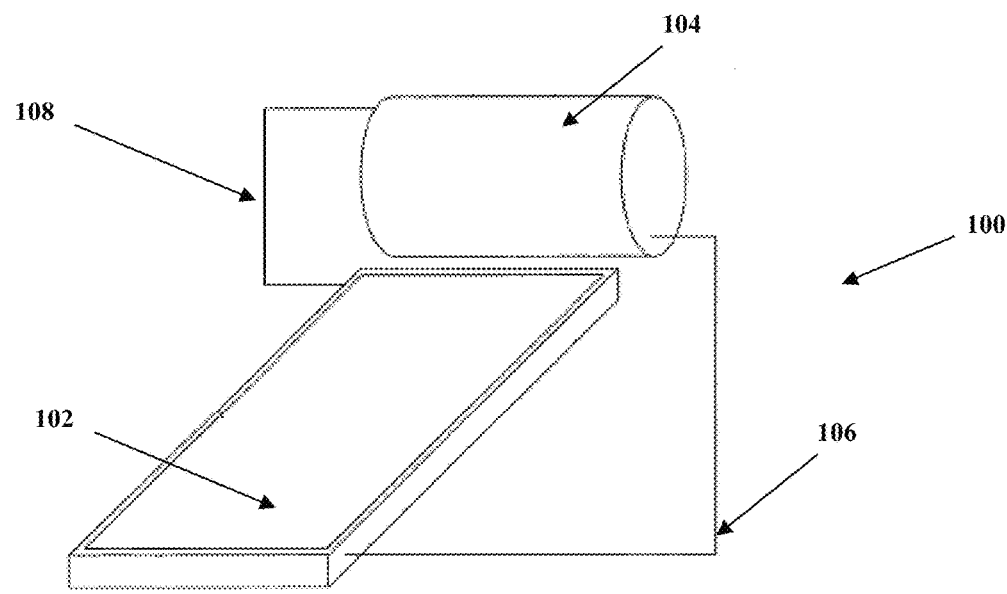
FIG. 1 illustrates a traditional solar water heater and storage tank, according to the prior art.

The above-described and other features will be appreciated and understood by those skilled in the art from the following detailed description, drawings, and appended claims.

DETAILED DESCRIPTION OF THE PREFERRED EMBODIMENT

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

To provide an overall understanding of the invention, certain illustrative embodiments and examples will now be described. However, it will be understood by one of ordinary skill in the art that the same or equivalent functions and sequences may be accomplished by different embodiments that are also intended to be encompassed within the spirit and scope of the disclosure. The compositions, apparatuses, systems and/or methods described herein may be adapted and modified as is appropriate for the application being addressed and that those described herein may be employed in other suitable applications, and that such other additions and modifications will not depart from the scope hereof.

Simplifications or omissions may be made to avoid obscuring the purpose of the section. Such simplifications or omissions are not intended to limit the scope of the present invention. All references, including any patents or patent applications cited in this specification are hereby incorporated by reference. No admission is made that any reference constitutes prior art. The discussion of the references states what their authors assert, and the applicants reserve the right to challenge the accuracy and pertinence of the cited documents. It will be clearly understood that, although a number of prior art publications are referred to herein, this reference does not constitute an admission that any of these documents form part of the common general knowledge in the art.

As used in the specification and claims, the singular forms "a", "an" and "the" include plural references unless the context clearly dictates otherwise. For example, the term "a transaction" may include a plurality of transaction unless the context clearly dictates otherwise. As used in the specification and claims, singular names or types referenced include variations within the family of said name unless the context clearly dictates otherwise.

Certain terminology is used in the following description for convenience only and is not limiting. The words "lower," "upper," "bottom," "top," "front," "back," "left," "right" and "sides" designate directions in the drawings to which reference is made, but are not limiting with respect to the orientation in which the modules or any assembly of them may be used.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

Figure 2:
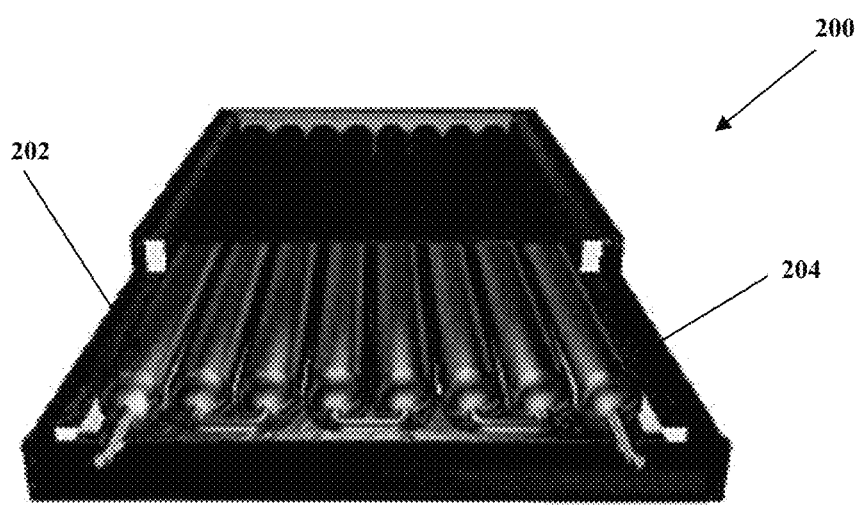
FIG. 2 illustrates a traditional solar water heater collector area, according to the prior art.

Referring to FIGS. 1-2, we see the typical present day solar heater configurations according to the prior art. The system 100 is comprised of a heating element or housing 102 and storage tank 104 connected via pipes 106, 108. The pipes within the system are usually under water-line pressure, typically in the 275.7 kPa to 448.2 kPa (40 to 65 psi). The pipes shown 106, 108 are there typically to accomplish convection recirculation, and may be assisted by water pumps. As the water in the tank 104 cools, it goes down the feedback line 106, into the heating element 102, rising with the gained temperature along the heating element solar heat collector, then going into the tank 104 via the pipe 108.

We can see that the layout 200 has a different heating element where, unlike 102 where you have typically less than four liters (one gallon) of heated water, in this layout 200 the water within the pipes is typically around 100 liters (approx. 25 gallons), so the pipes are the heat collector and tank. The pipes within it are usually connected in serial or parallel (serial requiring less joints). The serial connection shown 202 is accomplished by laying the pipes 204 along the longest length of the heating element 102 and turning the pipe at each end. Such a turn is optimally accomplished via 180 degree directions turns, but most often accomplished via dual 90 deg. turns. Of course, such turns are subjected to very large stresses, particularly as the water thermal gradient changes repeatedly over time, that is, they are prone to crack.

Similarly, since the volume inside the housing 102 enclosure must be maximized, the pipes inside 204 tend to be almost as large as the internal volume of the enclosure. This maximizes pressurized water exposure to the ambient and solar heat, but creates additional stresses at/near the bends, where the pipe must narrow/broaden to match the different gages required for an optimal design. Yet another place for cracks in the pipe.

In some embodiments, the heating element 102 pipes 204 need not be 'stood' 200 along their length, but may be 'laid' along it. Similarly, a water heater system may not have a tank 104, but consist simply of the heating elements 102. As noted, heating elements (perhaps electric powered) may be added to the system (usually within the tank 104) or along the flow of the inside pipes, in order to act as freezing preventers as well as supplemental heat source for extended periods of cloudy/cool weather.

The present invention is based on an improved solar heating system for heating water comprising an integral storage collector such including an absorber for absorbing solar energy, a heat storage medium of large heat capacity and high thermal conductivity for storing such energy and a water flow path in heat exchange relationship with the heat storage medium.

Figure 3:
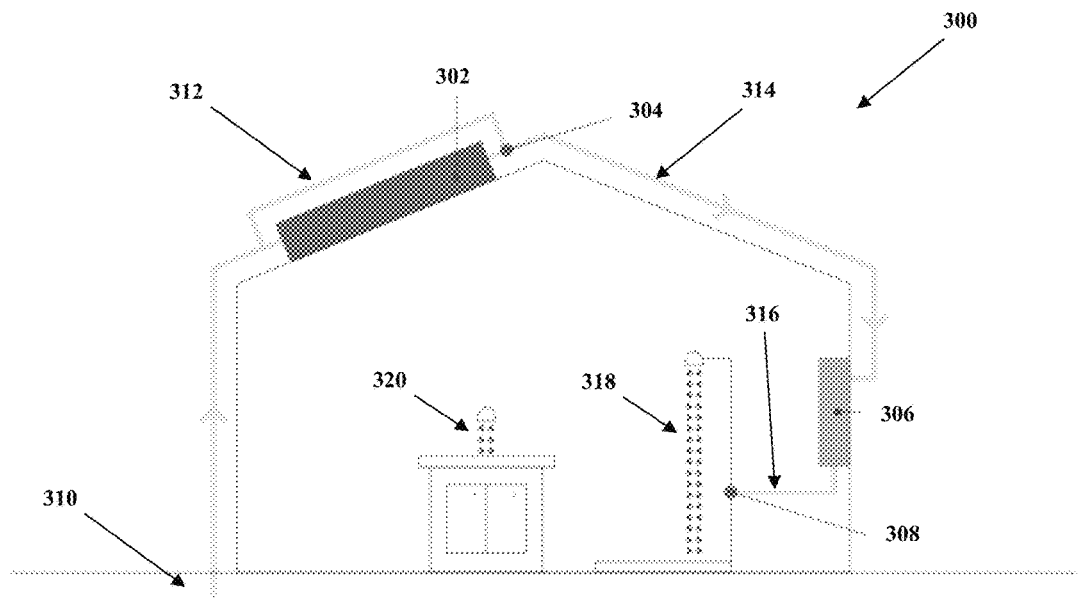
FIG. 3 illustrates an integral collector storage solar hot water home system, according to an exemplary embodiment of the invention.

Referring to FIG. 3 we show the proposed water heater system 300 in which an integral heat collector 302 collects the heat from the sun (as well as from the ambient heat) to raise the water temperature from that of the water when it comes into the house 310, typically 10 to 25 degrees C. (55 to 77 deg. F.) to that of the collector's 302 design temperature, typically around 70 deg. C. (about 160 deg. F.), although this may be adjusted within the design shown here. A bypass pipe 312, is used to 'go around' the heat collector/storage component 302, where the hot and input water are mixed at a water temperature regulating valve 304, resulting in flow in the outflow pipe 314 at a temperature programmed into the mixing valve 304, which in one embodiment is about 43 deg. C. (110 F), but which may adjusted manually and/or remotely.

The outflow pipe 314 then feeds into a supplemental heater 306 (preferably and in-line model, although a small tank system may also be used), which is designed to be off most of the time, and come online anytime the temperature in the outflow pipe 314 water drops below a programmable set minimum. The house input hot water pipe 316 then comes into an optional indoor water temperature valve 308 which is used to feed the shower 318, sink 320 and/or other hot water outlets within the home. For example, the indoor valve 308 may be set so the water inside the house (or the children's bathroom) never goes above 35 C (95 F). Having the supplemental heater 306 has certain benefits over having the heating element inside the tank. These include the tank lasting longer due to minimal or non-existent corrosion, easier replacement of the heating element if/when it fails (no need to open the tank). From an energy efficiency standpoint, another advantage is that when the heated water temperature coming out of 314 is below a certain threshold, only the water needed is heated, not all the water in the tank (which may later cool, unused).

As for the overall system, we notice the presence supplemental or auxiliary heating 306, designed to guarantee a modicum of comfort during extended cold or overcast conditions. The activation of such auxiliary heating 306 and/or mixing valve(s) 304 may be controlled via preprogrammed parameters, or remote electronic controls (such as an App or website within a tablet/computer and/or Smartphone), so that a house owner may adjust the temperature within their heater system, and activate/shutdown the supplemental heating element. Similarly, such activation may be automatic based on the weather forecast for the unit's locations, and/or through communicating with peer units. In another embodiment, the supplemental heating element 306 may be imbedded into the integral collector 302, and even activated as an anti-freeze prevention when the outside temperature drops below a certain temperature, optionally being heated at a lower rate/temperature, or at a reduced duty cycle, just that required to keep the water in the system from freezing.

Figure 4:
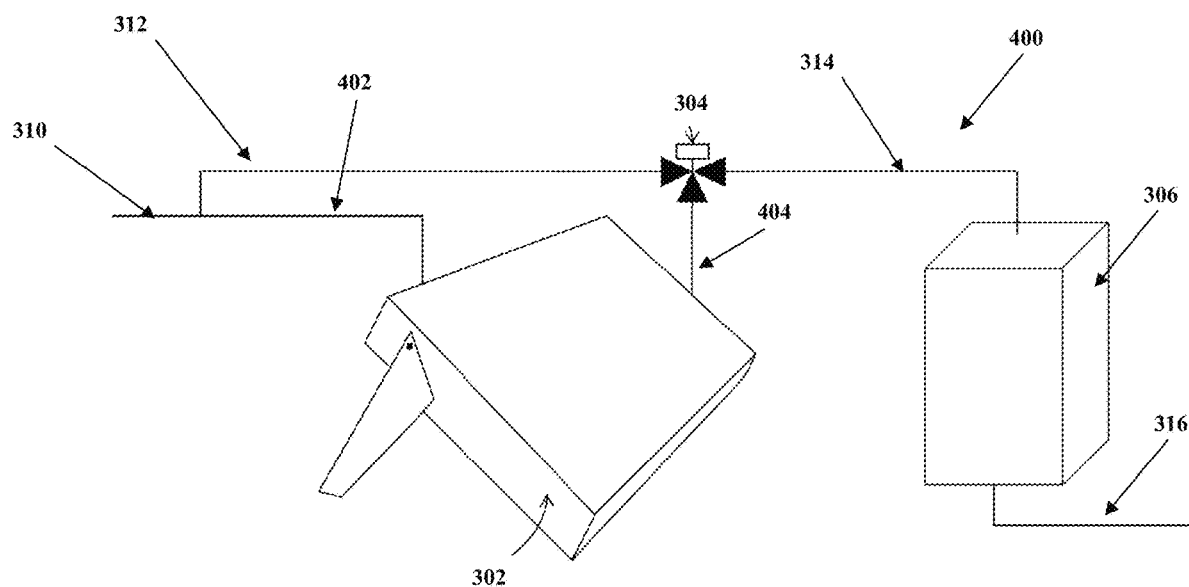
FIG. 4 illustrates the heating portions of the hot water home system, according to an exemplary embodiment of the invention.

Referring to FIG. 4, we see details 400 of a proposed embodiment of the heat collection and storage components, as well as portion of the proposed water mix. The ambient temperature water pipe 310 splits, one part forming the bypass 312, the other forming the pipe 402 going into the heat collector/storage unit enclosure 302. The heated water exits the unit 302 via a pipe 404 that feeds the valve 304, where the ambient water comes in by the bypass pipe 312 and the heated water from the heat unit 302. The valve exit pipe 314 the travels to the auxiliary or supplemental heater 306.

Among other advantages, in an internal or integral collector storage solar water heater, the collector area to storage volume is not adjustable by the installer, and hence the risk of overheating or under heating is removed.

Figure 5:
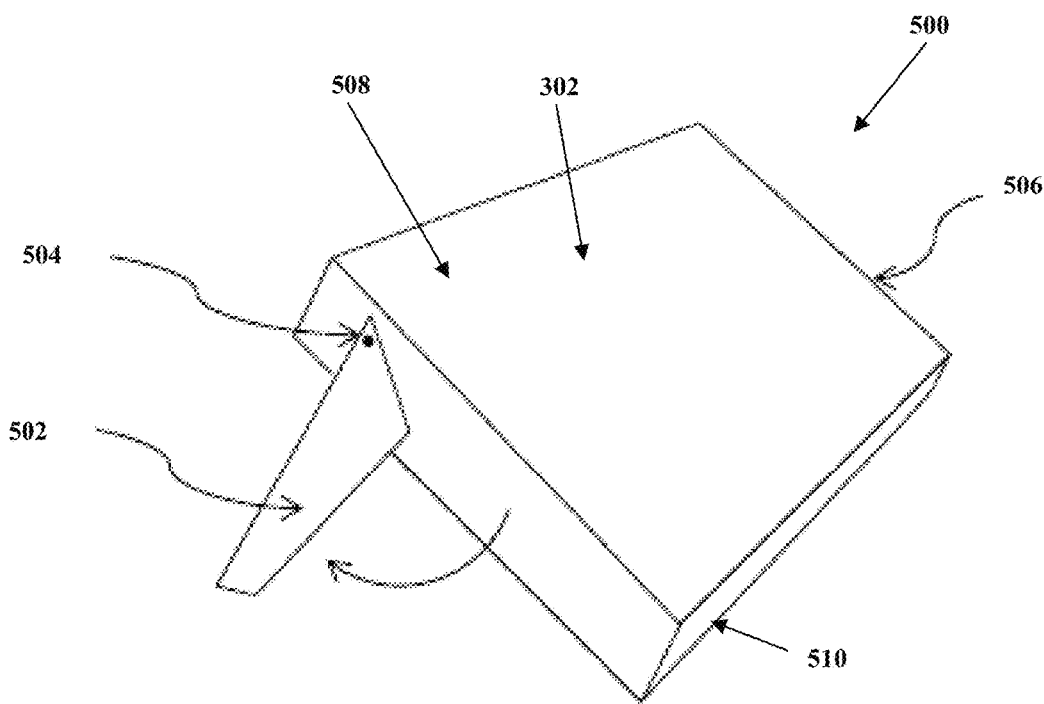
FIG. 5 illustrates the heat collector portion of the system, according to an exemplary embodiment of the invention.

In one embodiment, the heat collection and storage unit enclosure 302 (FIG. 5), is comprised 500 of an interior sealed heat enclosure 506 designed to be angled (as to maximize the local sun angle) via a bracket or through its leg 502 designed to be pivoted 504 off the enclosure. The enclosure 506 is designed to be a sealed volume holding a non-circulating thermal mass which may be comprised of a fluid, solid, fluid/solid mix and/or phase changing material designed to capture the heat from both the sun and the ambient temperature, and collect it within the enclosure 302.

The shown image 500 represents the outside enclosure of said heater, designed to house the internal enclosure, where the outside enclosure's 508 front/top side, i.e. the side facing the sunshine is in one embodiment comprised of a translucent material, say safety tempered glass, regular glass, laminated glass, plastic or any other suitable material. The goal is to get a translucent material having broad spectrum qualities, that is a substance conductive in the Ultraviolet (UV) through Infrared (IR) optical bands, so the majority of the sun's energy is introduced into the interior of said outside enclosure.

Figure 6:
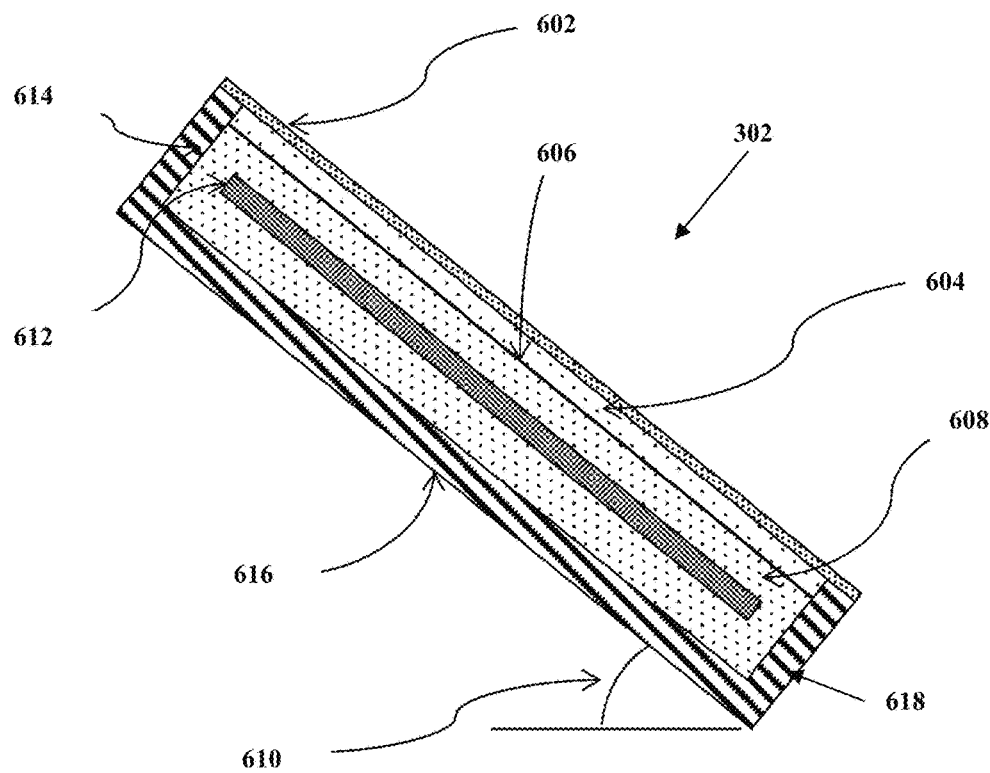
FIG. 6 is a cutaway of the heat collector, according to an exemplary embodiment of the invention.

FIG. 6 Shows the cross section 600 of a proposed embodiment of the collector/storage enclosure 302, where the sunlight first strikes the glazing material 602, behind which there is an air gap 604, before impacting the interior heat storage unit or thermal mass housing 606, said thermal mass 608 being contained within the sealed inner volume of said heat storage unit or thermal mass housing 606 which is comprised of walls 614, 616, 618 and preferably has some form of insulation placed in the space between the heat enclosure (outside) and the thermal mass housing or heat storage unit 606 walls (614, 616, 618). Such insulation may be comprised of any suitable insulation material, including but not limited to foam, cork, air or other suitable heat transfer block material. As noted, the elevation angle 610 is selected to provide the maximum average normal sunlight against the thermal mass housing 606 or to increment architectural aesthetics of the building. The final component is the heat exchange tubing coil 612. Note that having a coil 612 as a heat exchanger prevents sedimentation in the tank, a well known cause of corrosion which shortens the life of the tank. In addition, since the tubing coil 612 holds the pressure, the tank walls of the thermal mass housing 606 may be thinner, therefore creating a lighter and less expensive fixture that is easier to manufacture, transport and install.

One of the possible improvements in such a system comprises covering the glazing material 602 internal facing area (that facing the air gap 604) with at least one material that has a reflecting surface towards the air gap 604, so as to reflect any incident sun energy back onto the absorbent fascia of the heat storage enclosure 706 and the thermal mass 608.

Figure 7:
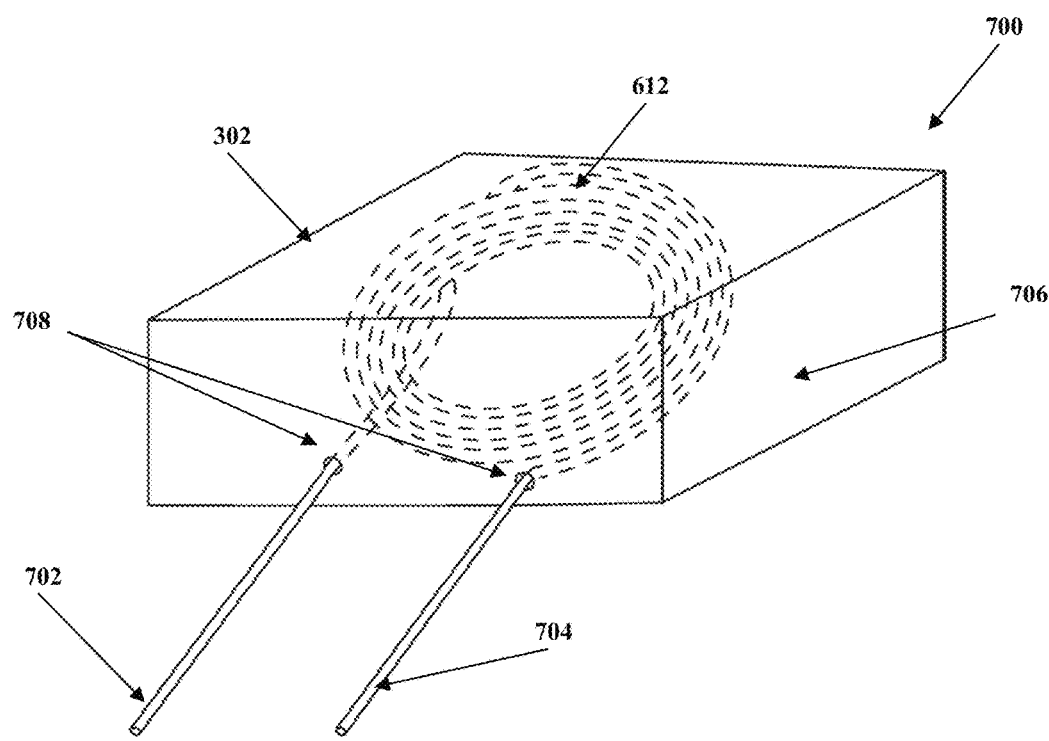
FIG. 7 illustrates a heat transfer coil placement within the heat collector, according to an exemplary embodiment of the invention.
Figure 8:
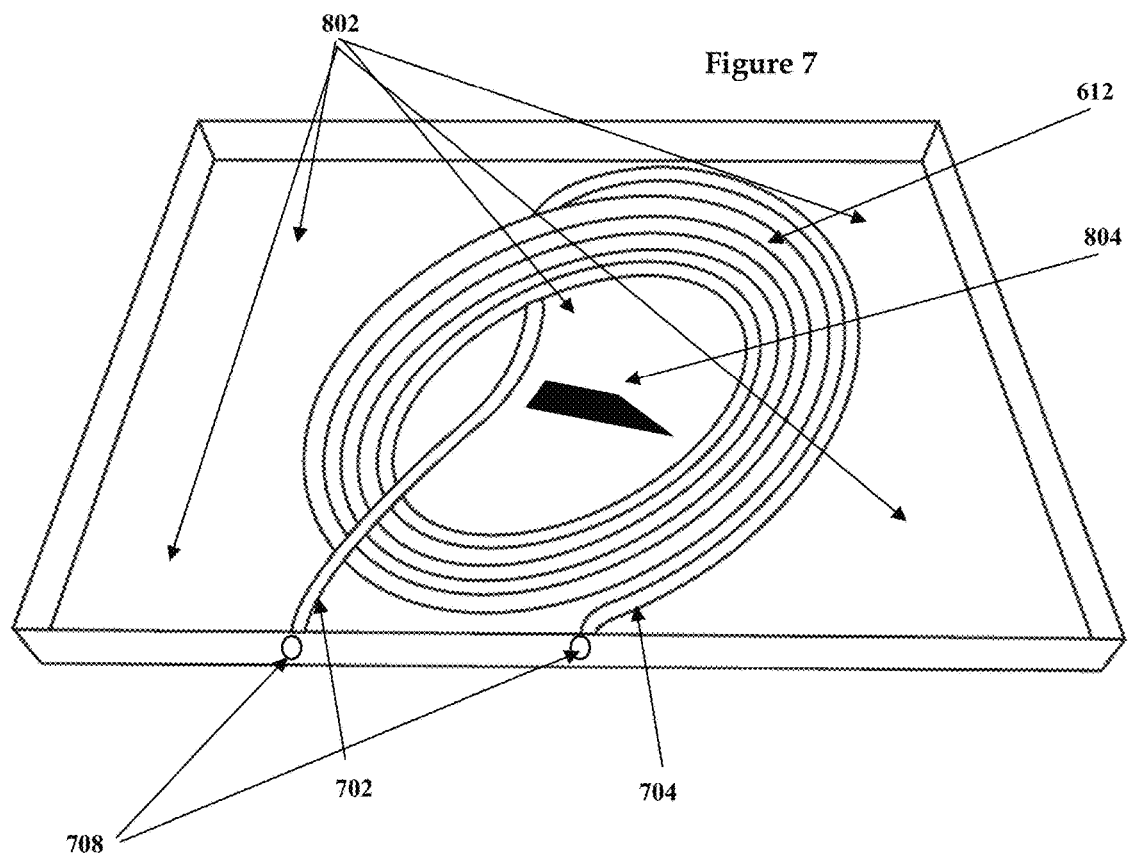
FIG. 8 illustrates the heat transfer coil placement within the heat collector, according to an exemplary embodiment of the invention.

The isometric views (FIGS. 7 and 8) help illustrate the coil 612 placement within the sealed enclosure 706 designed to be the heat battery or heat storage volume. The coil 612 is preferable made of a metal or plastic tube entering the enclosure 706 via an input pipe portion 702/704 so that the external pipes can be in fluid contact with the coil 612 tubing inside the heat storage enclosure 706 holding the thermal mass 608. In this fashion, the heat from the thermal mass 608 will be transferred to the water within the coil 612 and extracted. In one embodiment, the coil 612 is laid significantly flat, in successive concentric loops, so as to minimize the height of the heat storage enclosure 706. In another, height is used, with the coils forming a 'cone' or 'mountain'.

A geometric deficiency is seen when one looks at the tubing forming a circular coil 612 and the remaining area(s) 802 of the heat storage enclosure 706, both inside the coil 612 and outside (along the rectangle corners). In one embodiment, one or more stirrers or other suitable thermal mass moving components 804 (a propeller, a beater, a paddle) may be added to ensure that the thermal mass within the heat storage enclosure 706 has a balanced thermal gradient (or as even as possible). In other words, that as heat is removed by the fluid circulating within the coil 612, the corners (and center of the coil 612) contribute energy to the transfer, avoiding too many hot spots.

Notice the coil 612 may be a continuous pipe, or made of segments within the enclosure 706, which may extend outside the enclosure through openings 708, or the openings may comprise one or more fittings so that the pipe segments outside 702, 704 connect through said fittings to the internal pipe 612 portions. In this fashion the heat storing medium within the enclosure 706 remains within a sealed environment. An optional pressure relief valve may be attached to the enclosure 706, so that over pressure situations that may crack the enclosure are prevented. In an alternate embodiment, the tube comprising the fluid coil 612 may have fins or other tubing extrusions to enhance the thermal gradient from thermal storage medium 608 to the water inside said coil 612.

When water is not flowing through the coil 612, the storage medium 608 and the coil's content (water) will reach the same temperature. As flow begins, heat will be typically transferred to said coil's content. As such, the unit 302/1100/1200 is both a solar heater and an energy storage unit. The coiled shape contributes to the reliability of the unit through its natural avoidance of sharp turns, which also decreases pressure losses.

In one embodiment, said coil 612 is made of stainless steel. In another, of any suitable long lasting metal or metal alloy, including copper, aluminum, etc. In another embodiment, said coil is made of plastic, including PVC and other suitable plastics, composite (including carbon composites, Kevlar and others) or any other suitable material capable of keeping the dwelling/water line pressure and transferring said thermal storage medium heat to the water within the coil.

In one embodiment, the coil 612 cross section is constant, so that the flow of the heated fluid within the coil can be unimpeded by any changes in cross section and/or any buildup of material within the tube forming the coil.

In one embodiment, the cylindrical or circular coil shape is critical, for it allows the pipe to be free of turns or bends that may fail over time, as the coil expands/contracts in reaction to the thermal forces of the thermal gradient between the thermal mass 608 and the water within the coil 612, as it enters via one end 702 and exits through the other 704. Keeping any bends below 90 degrees (and preferably below 45 degrees) ensures the integrity of the coil 612 over time.

In some embodiments, the rectangular shape of the collector 302 and or enclosure may be favored, since it 'matches' the geometric shape of most solar panels. In such a case, the coil 612 may remain circular, or become an ellipse, as long as there are no sharp bends in the tubing that forms the coil or heat exchanger 612. As noted, in another embodiment, a rectangular shape for the coil 612 may be used.

Figure 13:
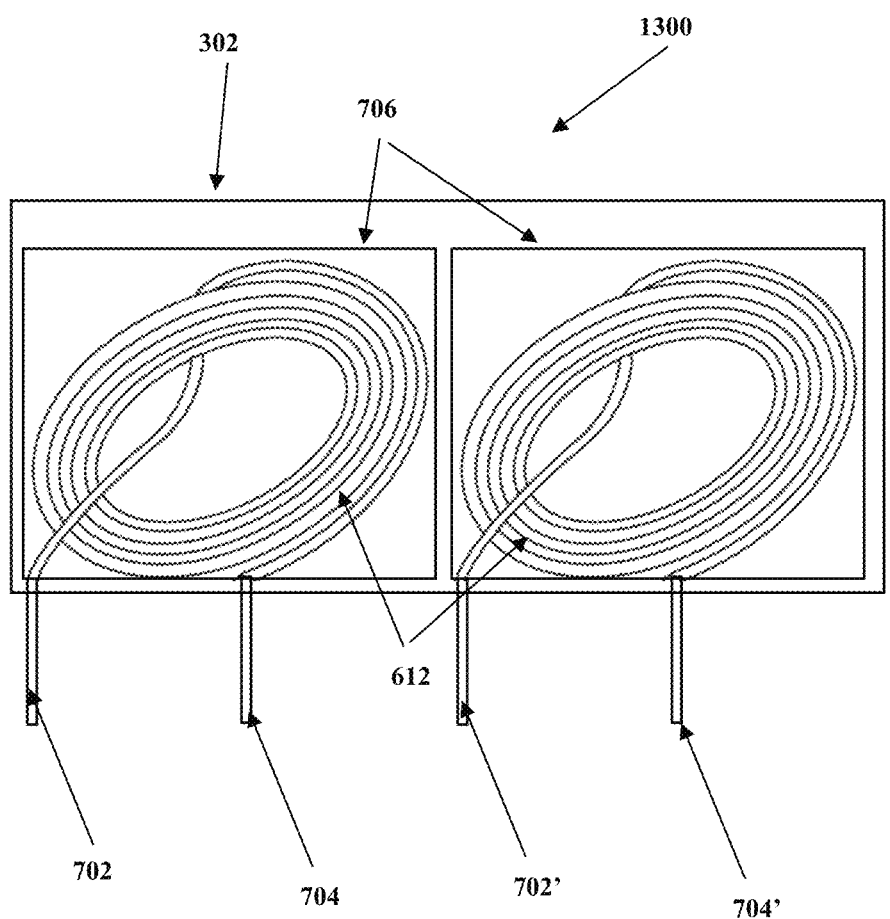
FIG. 13 illustrates the combination of two or more thermal enclosures to form a rectangular collector assembly, according to an exemplary embodiment of the invention.

Of course, the circular shape of the coil 612 within a rectangular enclosure 706 suffers from the circle inside the rectangle geometric inefficiency, so in another embodiment (FIG. 13), the enclosure 706 may be square and sized to contain the coil 612 within it. A single arrangement like this may be used, or in an alternate embodiment 1300 two or more such 'square' collectors 706 may be placed next to each other to create a 'rectangular' overall shape collector 302, with the coils 612 outputs being optionally connected in serial connections (entry pipe 402 to 702, exit 704 to entry 702' and assembly exit 704' to 404) or in parallel connections (entry pipe 402 to both 702/702', and exits 704/704' both to 404).

In one embodiment, the thermal mass 608 within the enclosure inner volume 706 is comprised of water (which may be optionally suitably treated (chemically or otherwise) to prevent any long term decay within the inner enclosure (algae, corrosion, etc.), which may be optimal as a low cost solution in tropical (non-freezing) climates. In another, the thermal mass 608 may be comprised of anti-freeze fluid (such as the coolant used in automobiles), which would provide insurance against the water within the coil 612 freezing, albeit at the cost of some efficiencies.

In another embodiment, the thermal mass 608 may replicate sea water, that is, be made of water with certain salts dissolved within it, have other solids suspended within it and/or use phase change materials (PCMs). In general, using higher specific gravity fluid would enhance the thermal mass 608 heat "battery" performance. PCMs fall into four main categories: water-based, salt hydrates, paraffin and vegetable-based.

Water-based ice and gel packs are extremely popular for keeping materials cold around 0° C. These low-cost devices have several advantages. They perform well and are non-toxic, non-flammable, environmentally friendly and easy to use, however they are useful only in applications requiring a temperature of 0° C. and are vulnerable to microbial growth.

Salt hydrates consist of inorganic salts and water. Their melt point temperatures range between 15° C. and 80° C. The advantages of salt hydrates are low material costs, high latent heat storage capacity, precise melting point, high thermal conductivity and inflammability. They do have poor nucleating properties, which make them vulnerable to super cooling, the phenomenon in which a substance cools below its freezing point without solidifying. That can be beneficial in some applications, but for most uses nucleating agents must be added to address this problem.

Paraffin are derived from petroleum and have a waxy consistency at room temperature. Their melt point temperatures range between −8° C. and 40° C. They have good thermal storage capacity and are proven to freeze without super cooling. Many paraffin are hazardous to health and the environment. Some can injure skin, eyes and mucous membranes. Some have narcotic effects if inhaled. Hexadecane, a petroleum alternative to PURETEMP18 is one example.

Bio-based PCMs are organic compounds derived from animal fat and plant oils. Their melt point temperatures range between −40° C. and 151° C. The most common bio-based PCMs are derived from fatty acids and have higher efficiency than salt hydrates and petroleum-based phase change material.

Using a combination of any of the above as a thermal mass 608 would represent an advantage in thermal storage, and accomplish an efficient transfer of the accumulate heat to the water inside the coil 612.

Figure 9:
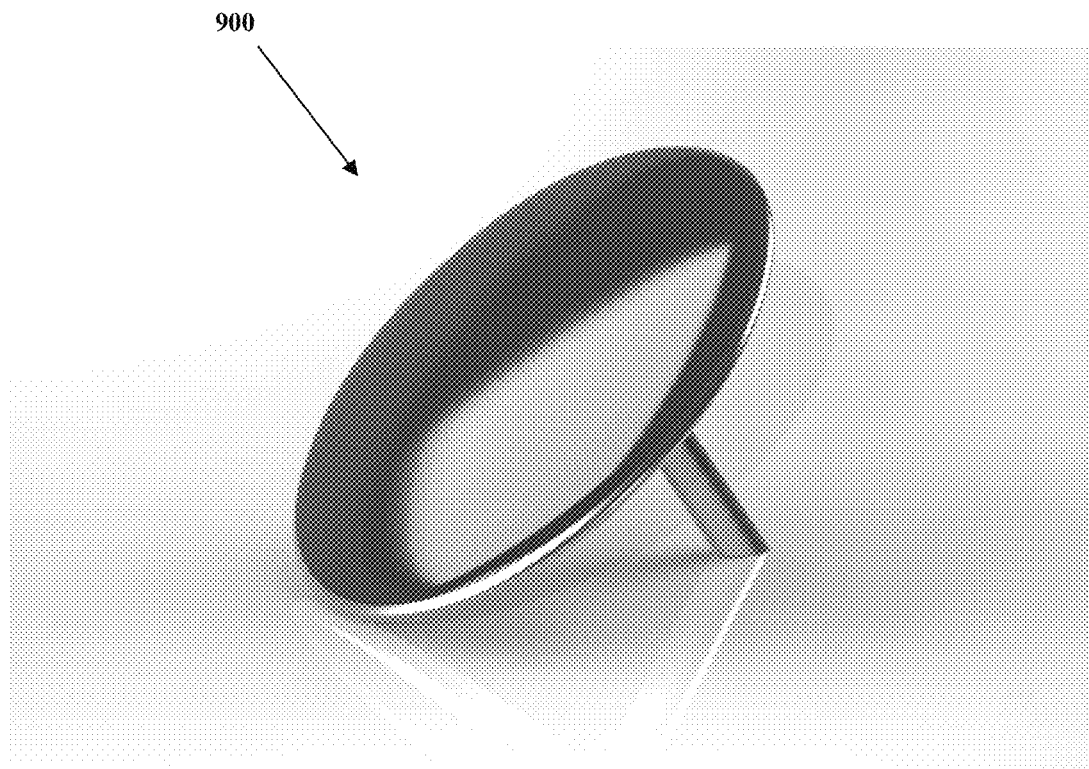
FIGS. 9 and 10 show views of a flattened spheroid shaped heat collector, according to an exemplary embodiment of the invention.
Figure 10:
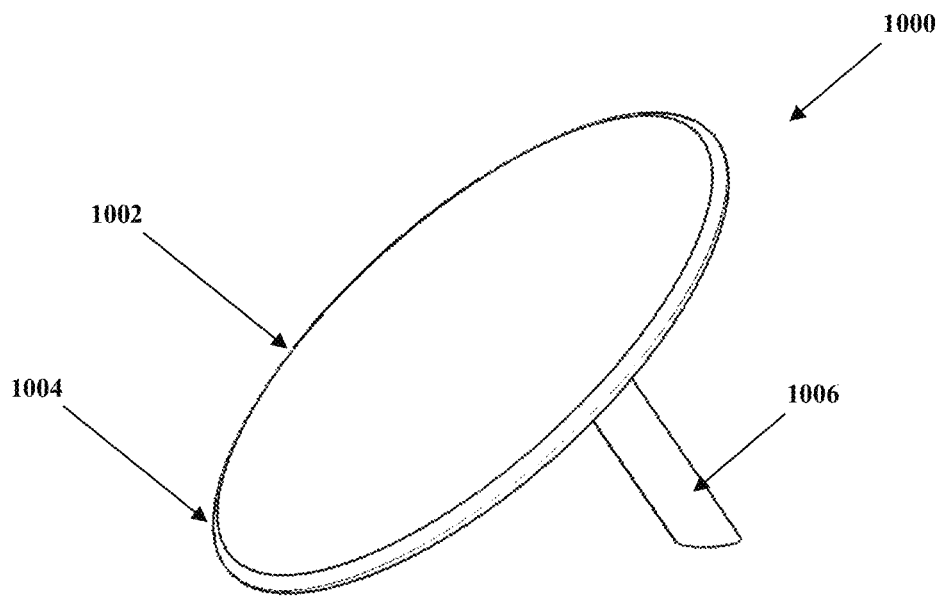
Figure 11:
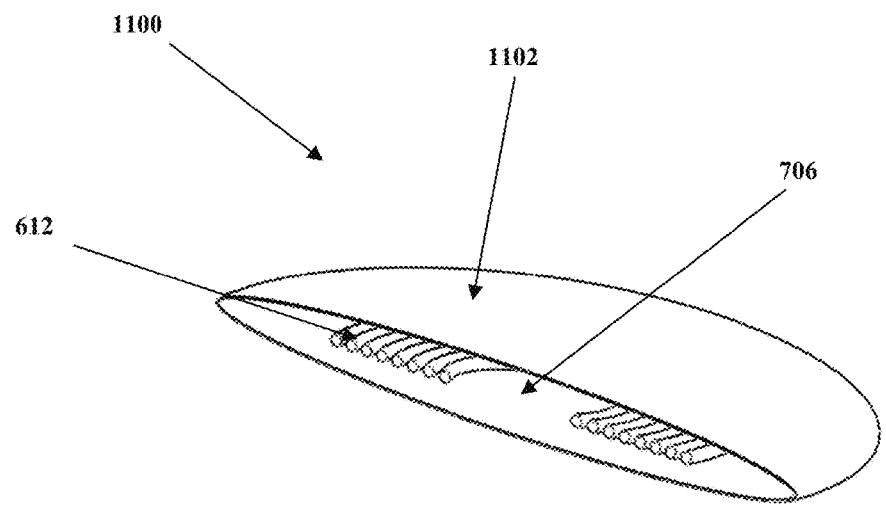
FIGS. 11 and 12 show the heat transfer coil placement within a flattened spheroid shaped heat collector, according to an exemplary embodiment of the invention.
Figure 12:
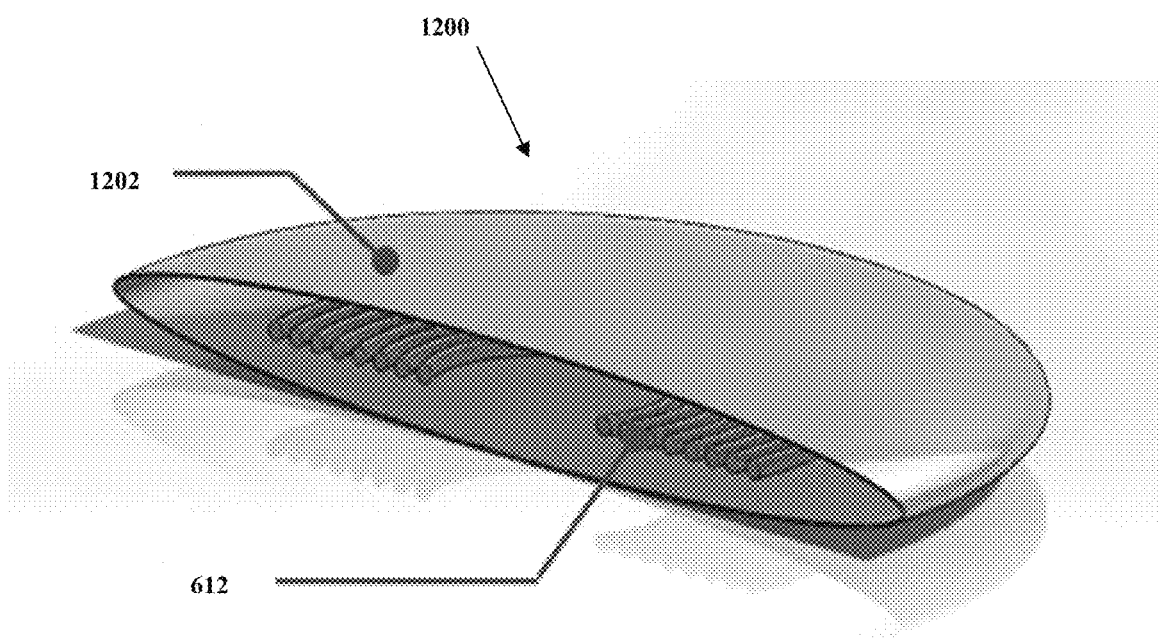

In an alternate embodiment, the shape of the heat collector/storage unit 900 (FIG. 9) may be a spheroid. A spheroid shape 900 allows for a large number of geometric efficiencies. A spheroid has less thermal losses and better distributed structural stresses than the other possible proposed shapes. For the same wetted area, the maximum heat capture for the medium would be accomplished by a flat surface, and the minimal heat loss (once the heating goes away) would be a sphere (again, for the same amount of medium or fluid). The spheroid shape produces a heater having a lighter weight and less material per unit volume of thermal mass, when compared to other shapes.

Structurally, the same effects tend to occur. In essence, the spheroid shape is the optimal configuration allowing the compromise of a maximum energy capture to the medium while the sun is heating, and a minimum loss when the air temperature/wind conditions/sun conditions make the spheroid an emitter of energy, due to its lower surface area to thermal mass 608 volume. The above provides an increase a gain in efficiency, when compared to other shapes. The improved structural advantages allow for better structural load distribution, no sharp corners, and excellent weight distribution on the system and the surface on which it is placed.

In an alternate embodiment, the inside of said front/top side 602/1002 is coated with reflective material so that the light (again, all suitable solar illumination or solar radiation from UV through IR) "stays" inside. This may be accomplished through a one way mirror, as well as through other light reflective means (including light in the UV and/or IR range).

The back/lower part 510/1004 of said outside enclosure is made of any sturdy material capable of supporting the assembly, including the inner enclosure as well as all the fluids involved. In one embodiment, said back/lower part 1004 is made of aluminum. One or more insulating agents may be placed inside/outside of said back/lower 1004, the goal being keeping any energy that has entered the outer enclosure 302/900 within it. The unit is stood through a stand 502/1006 in order to place it (depending in its location on earth) at an optimal sun angle and/or to favor building aesthetics. Note that the whole outer enclosure 302/900 is shown as matching the inner enclosure 606/1100 in one embodiment, it may not necessarily be so. In one embodiment, two or more thermal enclosures 706 may be fitted inside an external collector assembly 302.

In one embodiment, the internal enclosure 1100 is comprised of a spheroid, defining a sealed internal volume designed to have some or no limited access openings. In one embodiment, said internal enclosure shape components (walls/stands/etc) such as 302/618/1102 are made of stainless steel, steel, aluminum, or some other similar material. In one embodiment, the outer surface 1202 is coated or treated to maximize heat absorption and decrease heat emissivity from 1200 to the atmosphere. In an alternate embodiment, metal alloys of similar materials may be used to reduce costs. In yet another embodiment, plastics, composites and/or their combination with metal may be used. The internal enclosure shape houses a thermal mass 608 heat storage medium, which may be comprised of a fluid, solid and/or combination thereof, but is not under significant pressure and/or connected to the house water input.

In one embodiment, blackened paints, coatings, etc. are used in combination with low emissivity coatings. Black materials absorb sunlight very well, and heat up as a result. Since metallic materials do not naturally have a black surface, they need to be coated for selective absorption. Black, temperature-resistant lacquer can serve this purpose, but there are much better materials for absorber coating. If a black surface heats up, it emits part of the heat energy again as heat radiation, as can be shown with electrical hot plates: when the hot plate is on, heat radiation can be felt on the skin without touching the hot plate itself. A black lacquered absorber shows the same effect, transferring only part of the absorbed heat to the water that flows through the absorber tubes, while radiating some heat back into the environment.

So-called selective coatings absorb the sunlight almost as well as black lacquered surfaces, and re-emit a much smaller amount of heat radiation. While the coating processes needed for these materials are more complicated than those for lacquering, this is compensated for by much higher efficiencies. As a result, many absorbers today have selective coatings, with materials used including black chrome, black nickel or TiNOX.

CONCLUSION

In concluding the detailed description, it should be noted that it would be obvious to those skilled in the art that many variations and modifications can be made to the preferred embodiment without substantially departing from the principles of the present invention. Also, such variations and modifications are intended to be included herein within the scope of the present invention as set forth in the appended claims. Further, in the claims hereafter, the structures, materials, acts and equivalents of all means or step-plus function elements are intended to include any structure, materials or acts for performing their cited functions.

It should be emphasized that the above-described embodiments of the present invention, particularly any "preferred embodiments" are merely possible examples of the implementations, merely set forth for a clear understanding of the principles of the invention. Any variations and modifications may be made to the above-described embodiments of the invention without departing substantially from the spirit of the principles of the invention. All such modifications and variations are intended to be included herein within the scope of the disclosure and present invention and protected by the following claims.

The present invention has been described in sufficient detail with a certain degree of particularity. The utilities thereof are appreciated by those skilled in the art. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the foregoing description of embodiments.

The invention claimed is:

1. A solar heating system for heating water comprising:
a heat collector enclosure having at least one broad spectrum quality opening designed to be translucent to solar radiation;
heat storage components within said heat collector enclosure, said heat storage components comprised of one or more heat storage enclosures, each said heat storage enclosure having a sealed volume containing a thermal mass mix of materials and one or more lengths of tubing within said sealed volume;
wherein said thermal mass mix of materials is comprised of water in addition to a phase changing material suspended above said water; and
two or more sealed interface openings within each said heat collector enclosure and each said heat storage enclosures to allow for fluid contact between the lengths of tubing inside each said sealed heat storage enclosure inner volume and pipes external to said solar heating system, wherein all or part of said length of tubing travels across said phase changing material as well as across said water.

2. The solar heating system of claim 1 wherein;
each said length of tubing inside each said heat storage enclosure is comprised of one of more loops of tubing within each said heat storage enclosure; and
said phase changing material is comprised of a mixture of one or more of the following: paraffin, petroleum based PCM and/or Bio-based PCMs.

3. The solar heating system of claim 2 wherein;
said heat collector enclosure, said broad spectrum quality opening and each said heat storage enclosure have rectangular shapes;
said phase changing material is comprised of a mixture of one or more of the following: paraffin, petroleum based PCM and/or Bio-based PCMs;
one or more portions of the tubing inside each said heat storage collector have fins or other tubing extrusions;
thermal insulation material is placed in the space between one or more of said heat storage sides and the respective side of said heat collector enclosure that contains said heat storage component; and
said heat collector enclosure has a stand to support said lower layer at an angle to the horizontal datum.

4. The solar heating system of claim 2 wherein;
each said length of tubing is arranged as a coil having no turn at an angle sharper than 45 degrees.

5. The solar heating system of claim 4 wherein;
said heat collector enclosure, said broad spectrum quality opening and each said heat storage enclosure have rectangular shapes.

6. The solar heating system of claim 5 wherein;
one or more portions of the tubing inside each said heat storage collector have fins or other tubing extrusions.

7. The solar heating system of claim 6 wherein;
said heat collector enclosure has a stand to support said lower layer at an angle to the horizontal datum.

8. The solar heating system of claim 4 wherein;
said heat collector enclosure, said broad spectrum quality opening and said heat storage enclosure have spheroid shapes.

9. The solar heating system of claim 8 wherein;
one or more portions of the tubing inside each said heat storage collector have fins or other tubing extrusions; and
thermal insulation material is placed in the space between one or more of said heat storage sides and the respective side of said heat collector enclosure that contains said heat storage component.

10. The solar heating system of claim 9 wherein;
said heat collector enclosure has a stand to support said lower layer at an angle to the horizontal datum.

11. A solar heating system for heating water comprising:
a heat collector enclosure having at least one broad spectrum quality opening designed to be translucent to solar radiation;
heat storage components within said heat collector enclosure, said heat storage components comprised of one or more heat storage enclosures, each said heat storage enclosure having a sealed volume containing a thermal mass mix of materials and one or more lengths of tubing within said sealed volume;
wherein said thermal mass mix of materials is comprised of water in addition to a phase changing material suspended above said water, wherein all or part of said length of tubing travels across said phase changing material as well as across said water;
two or more sealed interface openings within each said heat collector enclosure and each said heat storage enclosures to allow for fluid contact between the lengths of tubing inside each said sealed heat storage enclosure inner volume and pipes external to said solar heating system
a mixing valve that mixes water from a water supply system with that exiting said coil tubing, said mixture ratio being such that the water does not exceed a specified maximum temperature; and
one or more supplemental heaters that take the mixing valve output fluid and if necessary, apply supplemental heat to bring it to a programmed temperature.

12. The solar heating system of claim 11 wherein;
each said length of tubing inside each said heat storage enclosure is comprised of one of more loops of tubing within each said heat storage enclosure; and
said phase changing material is comprised of a mixture of one or more of the following: paraffin, petroleum based PCM and/or Bio-based PCMs.

13. The solar heating system of claim 12 wherein;
said heat collector enclosure, said broad spectrum quality opening and each said heat storage enclosure have rectangular shapes;
one or more portions of the tubing inside each said heat storage collector have fins or other tubing extrusions;
thermal insulation material is placed in the space between one or more of said heat storage sides and the respective side of said heat collector enclosure that contains said heat storage component; and
said heat collector enclosure has a stand to support said lower layer at an angle to the horizontal datum.

14. The solar heating system of claim 12 wherein;
said heat collector enclosure, said broad spectrum quality opening and said heat storage enclosure have spheroid shapes,
one or more portions of the tubing inside each said heat storage collector have fins or other tubing extrusions;

thermal insulation material is placed in the space between one or more of said heat storage sides and the respective side of the said heat collector enclosure that contains said heat storage component; and said heat collector enclosure has a stand to support said lower layer at an angle to the horizontal datum.

15. The solar heating system of claim 12 wherein;

each said length of tubing is arranged as a coil having no turn at an angle sharper than 45 degrees.

16. The solar heating system of claim 15 wherein;

said heat collector enclosure, said broad spectrum quality opening and each said heat storage enclosure have rectangular shapes.

17. The solar heating system of claim 16 wherein;

one or more portions of the tubing inside each said heat storage collector have fins or other tubing extrusions; and thermal insulation material is placed in the space between one or more of said heat storage sides and the respective side of said heat collector enclosure that contains said heat storage component.

18. The solar heating system of claim 17 wherein;

said heat collector enclosure has a stand to support said lower layer at an angle to the horizontal datum.

19. The solar heating system of claim 15 wherein;

said heat collector enclosure, said broad spectrum quality opening and said heat storage enclosure have spheroid shapes.

20. The solar heating system of claim 19 wherein;

one or more portions of the tubing inside each said heat storage collector have fins or other tubing extrusions; and thermal insulation material is placed in the space between one or more of said heat storage sides and the respective side of said heat collector enclosure that contains said heat storage component.

21. The solar heating system of claim 20 wherein;

said heat collector enclosure has a stand to support said lower layer at an angle to the horizontal datum.

\* \* \* \* \*